US009143497B2

(12) United States Patent
Enderwick et al.

(10) Patent No.: US 9,143,497 B2
(45) Date of Patent: Sep. 22, 2015

(54) SYSTEMS AND METHODS FOR SECURING EMAIL IN MOBILE DEVICES

(71) Applicant: Symantec Corporation, Mountain View, CA (US)

(72) Inventors: Thomas Jeffrey Enderwick, La Jolla, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 82 days.

(21) Appl. No.: 13/946,033

(22) Filed: Jul. 19, 2013

(65) Prior Publication Data

US 2015/0026455 A1 Jan. 22, 2015

(51) Int. Cl.
*H04L 29/06* (2006.01)
*G06F 21/60* (2013.01)
*G06F 21/56* (2013.01)

(52) U.S. Cl.
CPC .............. *H04L 63/08* (2013.01); *G06F 21/566* (2013.01); *G06F 21/606* (2013.01); *H04L 63/0471* (2013.01); *H04L 63/145* (2013.01)

(58) Field of Classification Search
None
See application file for complete search history.

(56) References Cited

U.S. PATENT DOCUMENTS

| 8,875,029 | B1 * | 10/2014 | Naidu ........................... 715/752 |
| 2006/0010324 | A1 * | 1/2006 | Appenzeller et al. ......... 713/171 |
| 2007/0005713 | A1 * | 1/2007 | LeVasseur et al. ............ 709/206 |
| 2008/0162652 | A1 * | 7/2008 | True et al. ..................... 709/206 |
| 2009/0254994 | A1 * | 10/2009 | Waterson ........................ 726/26 |
| 2010/0227595 | A1 * | 9/2010 | Johnson et al. ............ 455/414.1 |
| 2014/0096246 | A1 * | 4/2014 | Morrissey et al. .............. 726/23 |

OTHER PUBLICATIONS

Voltage Security, Inc., Voltage Identity Based Encryption (VIBE), 2005, Air Force Research Laboratory , Information Directorate, Rome Research Site, Rome, New York, pp. 1-32.*
Neil J. Rubenking, Enlocked (review), May 8, 2012, PCMag, retrieved from PCMag.com, pp. 1-3.*
Ceelox Inc., Ceelox SecureMail, 2008, retrieved from ceelox.com, pp. 1-2.*

* cited by examiner

*Primary Examiner* — Jung Kim
*Assistant Examiner* — Adrian Stoica
(74) *Attorney, Agent, or Firm* — Holland & Hart, LLP

(57) ABSTRACT

A computer-implemented method for providing secure mobile email communications is described. At least one application programming interface (API) of a native email client is hooked in order to transmit data securely via email. The native email client is native to an operating system of the mobile device. An email originating from a registered application is detected, via the hooked API. The email includes the data to transmit securely. The registered application is registered in a registry according to a mobile application authentication procedure. The registry includes a plurality of registered applications authenticated according to the mobile application authentication procedure.

18 Claims, 7 Drawing Sheets

SYSTEMS AND METHODS FOR SECURING EMAIL IN MOBILE DEVICES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may be mobile so that users may carry these systems as they travel, shop, work, etc. A mobile computing device may host a number of concurrently running apps, each capable of network communication. A component of the operating system of the mobile computing device, one of the apps, or a combination of the two may allow a user of the mobile computing device to use a native email client to send data associated with an application to another computer device. The process of sharing data associated with an application on a mobile computing device via the native email client may present opportunities for unintended recipients to acquire access to this data through unintended data leakage and data breaches.

SUMMARY

According to at least one embodiment, a computer-implemented method for providing secure mobile communications in email is described. At least one application programming interface (API) associated with a native email client is hooked in order to transmit data securely via email. The native email client is native to an operating system of the mobile device. An email originating from a registered application is detected, via the hooked API. The email includes the data to transmit securely. The registered application may be a mobile application that is registered in a registry according to a procedure used to authenticate mobile applications. The registry may include a plurality of registered applications authenticated according to the mobile application authentication procedure.

In one embodiment, independent code may be executed in order to securely transmit the data via email. An executable of the independent code may be separate from an executable of the registered application. Upon detecting, via the hooked API, a call to the native email client from the registered application, the data may be emailed via the native email client. Emailing the data via the native email client may include intercepting a call to a method associated with the native email client, replacing the intercepted method of the native email client with a custom method from the independent code, and allowing the user, according to a policy configured to protect the data associated with the registered application, to draft the email with an encrypted copy of the data associated with the registered application.

In some embodiments, it may be determined, via the independent code, whether a registered email client is located on the mobile device. The registered email client may be registered in the registry of the encrypted file system according to the mobile application authentication procedure. Upon detecting, via the hooked API, a call to the native email client from the registered application and determining that the registered email client is located on the mobile device, the data may be emailed via the registered email client. Emailing the data via the registered email client may include intercepting a call to an interface associated with the native email client, replacing the intercepted interface of the native email client with a custom interface associated with the registered email client, encrypting a copy of the data associated with the registered application using an encryption key associated with the registered email client and the mobile device, and allowing the email to be sent via the registered email client according to a policy associated with the registered application. In some embodiments, emailing the data via the registered email client may include intercepting a call to an interface of a display API, replacing the intercepted interface with a custom interface derived from the independent code, allowing the user to draft the email via the custom interface and according to a policy, detecting the user pressing a send button associated with the custom interface, and emailing the data via the registered email client.

In one embodiment, it may be determined, via the independent code, whether a registered encryption gateway is associated with the native email client. The registered encryption gateway may be registered in the registry of the encrypted file system according to a gateway authentication procedure. Upon detecting, via the hooked API, a call to the native email client from the registered application and determining that the registered encryption gateway is associated with the native email client, the data may be emailed via the registered encryption gateway. Emailing the data via the registered encryption gateway may include intercepting a call to a method associated with the native email client, determining whether a policy associated with the registered application allows the user to draft the email, and upon determining the policy associated with the registered application allows the user to draft the email, replacing the intercepted method of the native email client with a custom method from the independent code.

In some embodiments, emailing the data via the registered encryption gateway may include mapping a multipurpose internet mail extensions (MIME) type of the data associated with the registered application to a custom MIME type and encrypting a copy of the data associated with the registered application using an encryption key associated with the registered encrypted gateway. In one embodiment, an encryption key pair may be generated, as part of the mobile application authentication procedure, where the encryption key pair is unique to the registered application and the mobile device. The encryption key pair may include a public encryption key and a private encryption key. Data associated with the registered application may be encrypted based on the encryption key pair.

A computer system configured to provide secure mobile communications in email is also described. The system may include a processor and memory in electronic communication with the processor. The memory may store instructions that are executable by the processor to hook at least one application programming interface (API) associated with a native email client in order to transmit data securely via email and to detect, via the hooked API, an email originating from a registered application. The native email client may be native to an operating system of the mobile device. The email may include the data to transmit securely. The registered application may be registered in a registry according to a mobile application authentication procedure. The registry may include a plurality of registered applications authenticated according to the mobile application authentication procedure.

A computer-program product for providing secure mobile communications in email is also described. The computer-program product may include a non-transitory computer-readable medium that stores instructions. The instructions may be executable by a processor to hook at least one API associated with a native email client in order to transmit data securely via email and to detect, via the hooked API, an email originating from a registered application. The native email client may be native to an operating system of the mobile device. The email may include the data to transmit securely. The registered application may be registered in a registry according to a mobile application authentication procedure. The registry may include a plurality of registered applications authenticated according to the mobile application authentication procedure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
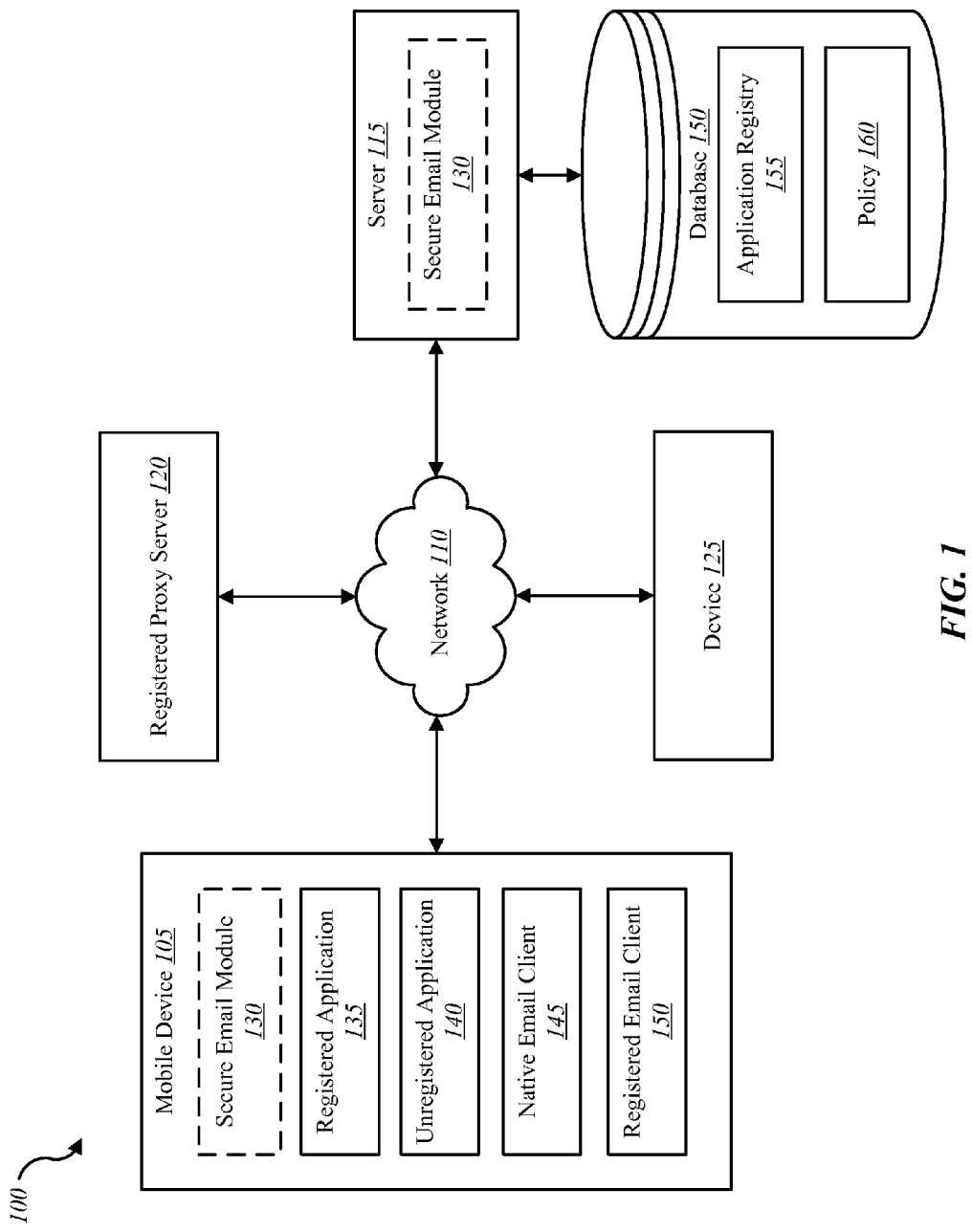
FIG. 1 is a block diagram illustrating one embodiment of an computer system in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A mobile computing device may host a number of concurrently running applications (apps), each capable of network communication. With the advent of mobile device "app stores", applications may be developed by relatively unknown entities across the globe. With relatively loose standards on mobile devices, security risks are presented to otherwise secure networks through data leakage and data breaches. For example, a software development kit (SDK) may allow a programmer to add a computer programming class (i.e., an object-oriented programming construct used to define distinct types of data) to a mobile application that the programmer has created, which allows a user of the mobile application to call methods, subroutines, objects, instances, and interfaces of the class without leaving the mobile application. For instance, adding the MFMailComposeViewController class in an APPLE® iOS mobile application may allow a user of the mobile application to compose and send email directly within the mobile application. This control may also allow the inclusion of file attachments, which may result in data leakage and data breaches between the mobile application and other applications on the mobile device. Additionally, policy regarding use of data associated with the mobile application may be violated (e.g., corporate data security policies) when a user emails the data as an attachment from a mobile device. The present systems and methods enable transparent and secure handling of encrypted data between mobile applications on a mobile device, native email clients, secure email clients, and secure proxies without requiring changes to the underlying code of a mobile application.

FIG. 1 is a block diagram illustrating one embodiment of a computer system 100 in which the present systems and methods may be implemented. As depicted, the computer system 100 includes mobile device 105, network 110, server 115, registered proxy server 120, and device 125. Mobile device 105 may include secure email module 130, registered application 135, unregistered application 140, native email client 145, and registered email client 150. Although depicted with a single registered application 135 and single unregistered application 140, mobile device 105 may include two or more registered and/or two or more unregistered applications.

Server 115 may connect to database 150. Database 150 may be internal or external to server 115. In some embodiments, database 150 is internal to mobile device 150. Alternatively, mobile device 105 may connect directly to database 150 either through network 110 or via a wired or wireless connection. Database 150 may include application registry 155 and policy 160.

Although computer system 100 is shown and described herein with certain components and functionality, other embodiments of the computer system 100 may be implemented with fewer or more components or with less or more functionality. For example, some embodiments of the computer system 100 may not include a network, a server, an encrypted proxy server (e.g., registered proxy server 120), or other devices (e.g., device 125). In some embodiments, the computer system 100 may include only mobile device 105 and the operations of the present systems and methods occur on mobile device 105. Additionally, some embodiments of the computer system 100 may include multiple servers, multiple networks, one or more additional devices and/or multiple encrypted proxy servers. In some embodiments, the computer system 100 may include similar components arranged in another manner to provide similar functionality, in one or more aspects.

Mobile device 105 and server 115 may include secure email module 130. Although secure email module 130 is depicted in FIG. 1 as being located on both server 115 and mobile device 105, other embodiments of the computer system 100 may include secure email module 130 located solely on server 115 or located solely on mobile device 105. Alternatively, in some embodiments, secure email module 130 may operate concurrently on both server 115 and mobile device 105. Examples of mobile device 105 include a smartphone, a tablet, a cell phone, a personal digital assistant (PDA), and other similar handheld, mobile computing devices. Examples of server 115 include a proxy server, a mail server, a web server, a server platform, an application server, a real-time communication server, a collaboration server, a file transfer protocol (FTP) server, a list server, a telnet server, a virtual server, and the like. Network 110 may include a virtual private network (VPN) system. Additionally, network 110 may include gateways, firewalls, nodes, and other network devices.

In one embodiment, the secure email module 130 may be configured to secure data associated with registered application 135. For instance, secure email module 130 may prohibit data transfer between registered application 135 and unregistered application 140, provide secure data transfer between registered application 135 and another registered application located on mobile device 105, and provide secure communications of data between mobile device 105 and another device (e.g., server 115, registered proxy server 120, and/or device 125) via network 110. In one example, secure email module 130 may be configured to protect data whether it is emailed from mobile device 105 via a native email client 145, via registered email client 150, and/or through registered proxy server 120. In some embodiments, reference to an application (e.g., registered application 135 and registered email client 150) or an entity (e.g., registered proxy server) as being "registered" may represent a process through which the application or entity is registered in a registry (e.g., application registry 155) according to a predetermined authentication procedure for the purpose of preventing data leakage and data breaches. The authentication procedure may be specified by and implemented according to policy 160. Examples of protocols associated with registration in the encrypted file system registry may include encryption of data based on encryption key pairs and data security policies that dictate how and when data may be communicated and shared in relation to registered applications, unregistered applications, registered entities, and unregistered entities. Thus, according to policy 160 and in conjunction with registered application 135, registered email client 150, and registered proxy server 120, secure email module 130 may ensure the secure communication of data to, from, and within mobile device 105. Further details regarding the secure email module 130 are provided below with regards to the following figure descriptions.

Figure 2:
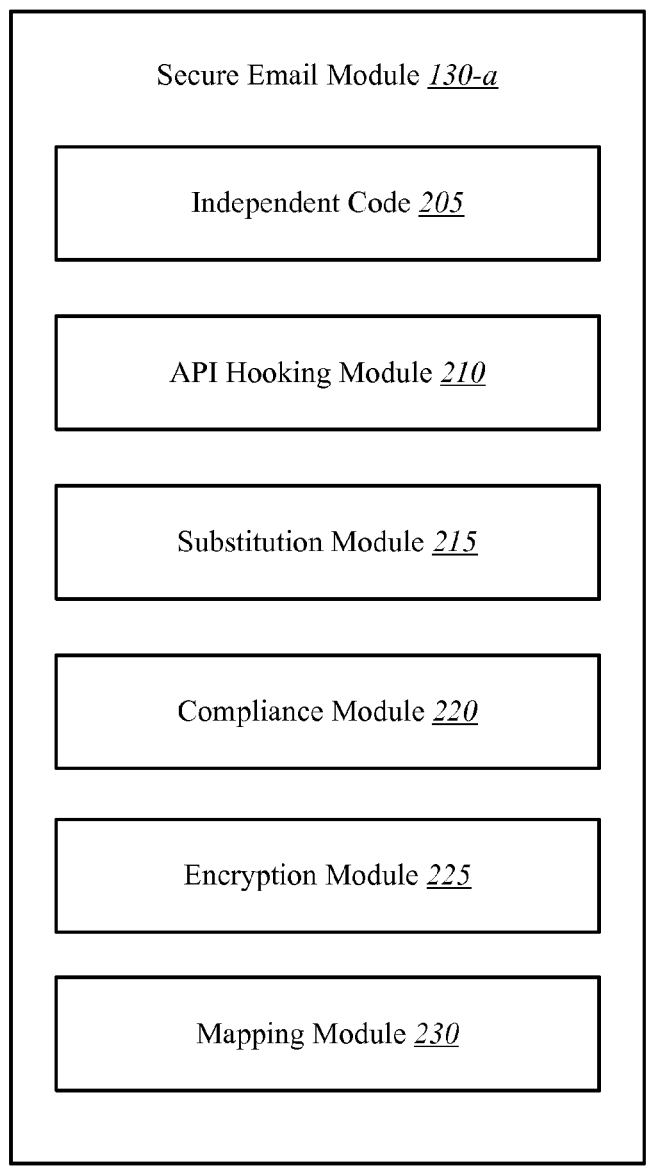
FIG. 2 is a block diagram illustrating one example of a secure email module.

FIG. 2 is a block diagram illustrating one example of secure email module 130-*a*. The depicted secure email module 130-*a* may be one example of secure email module 130 depicted in FIG. 1. Secure email module 130-*a* may include independent code 205, application programming interface (API) module 210, method substitution module 215, policy verification module 220, encryption module 225, and mapping module 230.

In one embodiment, secure email module 130-*a* may be configured to communicate data securely between mobile device 105, server 115, registered proxy server 120, and/or device 125 in a manner that minimizes data leakage and data breaches. The secure mobile communications may be established at least in part via secure email module 130-*a* authenticating one or more applications and/or entities and registering the authenticated applications and/or entities in application registry 155. In some embodiments, the secure email module 130-*a* may determine whether an application on a mobile device 105 or an external entity with which mobile device 105 communicates is registered in application registry 155. As described above, a registered application is an application that can communicate data associated with the registered application without placing the communicated data in jeopardy of data leakage or a data breach. Thus, the secure email module 130-*a* may be configured to establish an email communication protocol for the secure communication of data between registered applications on mobile device 105 and a device external to mobile device 105.

In one embodiment, API hooking module 205 may be configured to hook at least one API of an operating system that is associated with a native email client for the purpose of securely transmitting data via email. The native email client may be the native or default email client of the operating system of the mobile device. Thus, API hooking module 205 may detect a call to initiate a function, method, and/or interface of the native email client where the call originates from a registered application. The email may include the data that is to be transmitted securely via secure email module 130-*a*. The registered application may be any mobile application located on a mobile device (e.g., mobile device 105) that is registered in a registry (e.g., application registry 155) according to an authentication procedure, such as a procedure to authenticate mobile applications installed on a mobile device.

In one embodiment, application registry 155 may be configured according to policy 160, which may be administered by a user or administrator of system 100. Policy 160 may specify how to treat data at rest, data in use, and data in motion associated with registered application 135. For example, policy 160 may specify how data may be shared between applications, what to do with data received by registered application 135, how to handle data sent from registered application 135, and the like. For instance, if an administrator configures a policy to encrypt the data of one or more registered applications, then "independent" code associated with the secure email module 130 (i.e., code that is executed separately from the code of the registered application) may encrypt data of the one or more registered applications. The policy may specify how data may be shared between registered and unregistered applications (e.g., allow sharing between registered applications, and block sharing between registered applications and unregistered applications) and how data from a registered application may be transferred securely to an external device (e.g., from mobile device 105 to device 125). In one embodiment, secure email module 130 may encrypt the writing of data to registered application 135 in order to secure the data according to the settings of policy 160. Additionally, secure email module 130 may decrypt a reading of data from registered application 135 to allow the data to be emailed in a readable form according to the settings of policy 160. In some embodiments, secure email module 130 may intercept a call to a method, object, initiation, interface, or instance of a class reference of the operating system (e.g., a call to the MFMailComposeViewController class reference) and replace the interface of a native class reference with a customized method, object, initiation, interface, or instance. The customized interface may include methods and operations similar to the interface of the native class reference. For example, an interface of an email class reference may include fields for "To," "CC," "BCC," "Subject" and "Body," as well as user interface controls such as "Send," "Attach," and "Cancel." However, using the customized interface secure email module 130-*a* may enable and disable methods and interface elements of the replaced, native interface according to the settings of policy 160. For example, the customized interface may allow a user to send an email (e.g., allowing a "canSendMail" method according to a setting of policy 160), but block the user from attaching data to the email (e.g., blocking a "canAttachData" method according to a setting of policy 160).

In one embodiment, policy 160 may specify how and/or whether data associated with a particular registered application may be shared, emailed, or transferred. Thus, secure email module 130-*a* may ensure that data associated with a particular registered application may allow decryption of the data for viewing the data from the particular registered application, but block all other uses. For instance, if a user attempts to email the data or share the data with another application, secure email module 130-*a* may block the operation by canceling any calls to class references or APIs. In response to blocking the use of the data, secure email module 130-*a* may provide a notification message to a user that the operation is blocked. In some embodiments, policy 160 may specify that data from a registered application may be emailed. In this case, secure email module 130-*a* may intercept a call to a class reference or API, replace an interface of the called class reference with a customized interface with controls and methods enabled according to policy 160. If policy 160 specifies that data at rest is stored in an encrypted state, secure email module 130-*a* may also maintain all copies of the data (e.g., copies of the data placed temporarily in a pasteboard or clipboard until emailed, decrypting the copy before it is emailed. In some embodiments, secure email module 130-*a* may implement a customized pasteboard (e.g., an encrypted pasteboard using an encryption key pair of a registered application/entity).

Thus, in some embodiments, the registry may be administered and operated by an administrator (e.g., administrator of system 100). Application registry 155 may include a plurality of registered applications that are authenticated according to the mobile application authentication procedure, which procedure may be stipulated by policy 160. Additionally, or alternatively, application registry 155 may include a plurality of authenticated entities, devices, servers, gateways, etc., that are allowed to interact and communicate with registered application 135 according to the settings of policy 160 and by virtue of being registered in the registry.

In one embodiment, secure email module 130-*a*, in conjunction with a processor, may execute code that is "independent" (e.g., independent code 205) from code associated with a mobile application on a mobile device (e.g., registered application 135), allowing secure email module 130-*a* to transmit securely data from a mobile application without any modification to the mobile application's code. Thus, secure email module 130-*a* may execute independent code 205 in order to securely transmit the data via email. Thus, an executable of the independent code may be separate from an executable of a mobile application on the mobile device (e.g., registered application 135).

In some embodiments, secure email module 130-*a* in conjunction with compliance module 220 may scan mobile device 105 for registered applications and entities to enable the secure communication of data associated with registered application 135. In one embodiment, secure email module 130, in conjunction with independent code 205, may determine whether a registered email client is located on mobile device 105. In one embodiment, secure email module 130, in conjunction with independent code 205, may determine whether a registered encryption gateway is associated with native email client 145.

Upon determining a registered email client is not located on mobile device 105 and that a registered encryption gateway is not associated with native email client 145, secure email module 130-*a* may securely transmit data to and from registered application 135 in conjunction with native email client 145. Thus, upon detecting, via a hooked API, a call to an interface associated with native email client 145 from registered application 135, secure email module 130-*a* may securely email the data in conjunction with native email client 145 and according to the settings of policy 160. In one embodiment, substitution module 215 may intercept a call to a method (e.g., method, object, initiation, instance, interface of an object-oriented class or type) associated with a native process of an operating system of a mobile device (e.g., native email client 145 on mobile device 105). Substitution module 215 may replace the intercepted method associated with the native email client with a custom method. The custom method may be associated with the independent code 205. In some embodiments, compliance module 220 may allow a user, according to a policy (e.g., policy 160) configured to protect the data associated with a registered application, to draft the email with data associated with the registered application. The data that is emailed may include an encrypted copy of the data associated with the registered application. For example, secure email module 130-*a* may temporarily store an encrypted copy of the data on a pasteboard used for temporary data storage and/or data transfer. Before sending the email, secure email module 130-*a* may decrypt the encrypted copy to allow the data to be read by the recipient of the email.

Upon determining a registered email client is located on mobile device 105, secure email module 130-*a* may send the email in conjunction with the registered email client (e.g., registered email client 150) and according to the settings of a data security policy (e.g., policy 160). In one example, registered email client 150 may be registered in application registry 155 according to a specified authentication procedure of policy 160. Registered email client 150 may operate according to the settings of policy 160 in order to secure the transmission of data to and from registered application 135. Thus, upon detecting, via the hooked API, a call to the native email client from a registered application and determining that a registered email client is located on mobile device 105, secure email module 130 may email data from registered application 135 via registered email client 150. In one embodiment, substitution module 215 may intercept a call to an interface of a native email client. Substitution module 215 may replace the intercepted interface of the native email client with a custom interface associated with a registered email client. In one embodiment, encryption module 225 may encrypt a copy of the data associated with the registered application using an encryption key that is unique to and associated only with the registered email client and the mobile device. In one embodiment, compliance module 220 may allow the email to be sent via the registered email client in accordance with one or more settings of policy 160. In some embodiments, substitution module 215 may intercept a call to an interface of a display API. Substitution module 215 may replace the intercepted interface with a custom interface from independent code 205. The custom display interface may include customized methods and functions allowing the user to draft an email and add data to the email. The enabled functions of the custom display interface may allow a user to draft an email while maintaining the security of data sent in the email according to policy 160. Substitution module 215 may detect the user pressing a send button associated with the custom interface. Upon detecting the press of the send button, secure email module 130 may remove the custom interface from view and email the data via registered email client 135.

Upon determining an encryption gateway is associated with a native email client on mobile device 105, secure email module 130-*a* may send the email in conjunction with the encryption gateway (e.g., registered proxy server 120) and according to the settings of a data security policy (e.g., policy 160). In one example, registered proxy server 120 may be registered in application registry 155 according to a specified authentication procedure of policy 160. Thus, registered proxy server 120 may operate according to the settings of policy 160 in order to secure the transmission of data to and from registered application 135. Upon detecting, via the hooked API, a call to a native email client from a registered application and determining that a registered proxy server 120 is associated with the native email client, secure email module 130-a may email the data securely in conjunction with registered proxy server 120. Substitution module 215 may intercept a call to a method of a native email client. Before allowing a user to draft an email, compliance module 220 may determine whether a policy associated with the registered application allows the user to draft the email. Upon determining the policy associated with the registered application allows the user to draft the email, substitution module may replace the intercepted method of the native email client with a custom method associated with the registered email client. In some embodiments, encryption module 225 may encrypt a copy of the data associated with a registered application using an encryption key that is unique to and associated only with registered proxy server 120.

In some embodiments, encryption module 225 may generate, as part of an authentication procedure to be registered in application registry 155, an encryption key pair that is unique to the registered application and the mobile device, the encryption key pair comprising a public encryption key and a private encryption key, wherein data associated with the registered application is encrypted based on the encryption key pair.

In one embodiment, secure email module 130-a may associate a custom data type with the data associated with a registered application. Examples of data types may include multipurpose internet mail extensions (MIME) types, uniform type identifiers (UTIs), filename extensions, and generally any type of data file. For example, if data typically associated with a mobile application included text file (e.g., "TXT" data type), secure email module 130-a may assign a custom data type (e.g., "SECURE-TXT" data type) upon registering the mobile application in application registry 155. Thus, in some embodiments, mapping module 230 may map a MIME type of the data associated with a registered application to a custom MIME type. Mapping module 230 may store mappings between registered applications and custom data types in database 150, thus enabling secure email module 130-a to identify which registered applications can handle certain custom data types.

Figure 3:
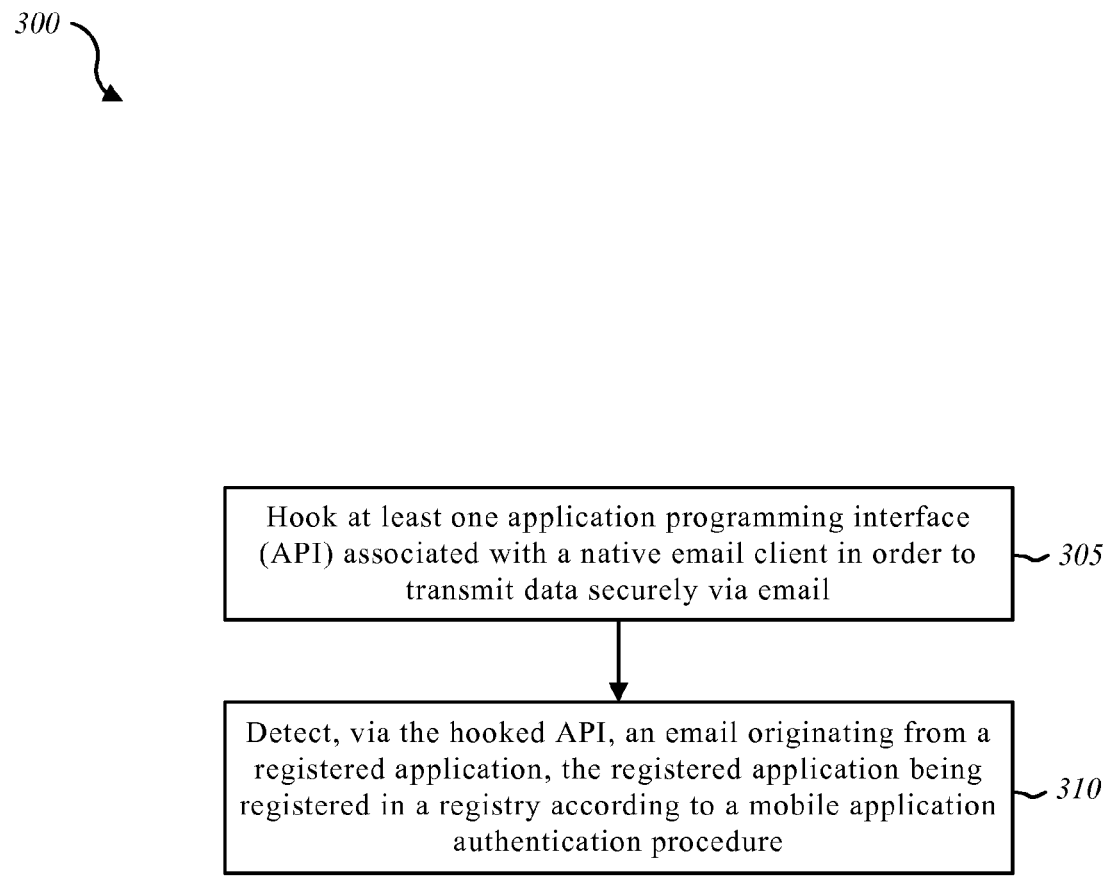
FIG. 3 is a flow diagram illustrating one embodiment of a method to establish secure mobile email communications.

FIG. 3 is a flow diagram illustrating one embodiment of a method 300 to establish secure mobile email communications. In some configurations, the method 300 may be implemented by the secure email module 130 depicted in FIGS. 1 and/or 2.

At block 305, at least one application programming interface (API) associated with a native email client of an operating system on a mobile device may be hooked in order to securely transmit data to and from the mobile device via email. The native email client may be native to the operating system of the mobile device. At block 310, an email originating from a registered application may be detected, via the hooked API. The email may include the data to transmit securely. The registered application may be registered in a registry according to a mobile application authentication procedure. The registry may be part of a policy maintained by an administrator that defines how data from a group of authenticated mobile applications may be transferred between registered and unregistered applications and from one device to another device.

Figure 4:
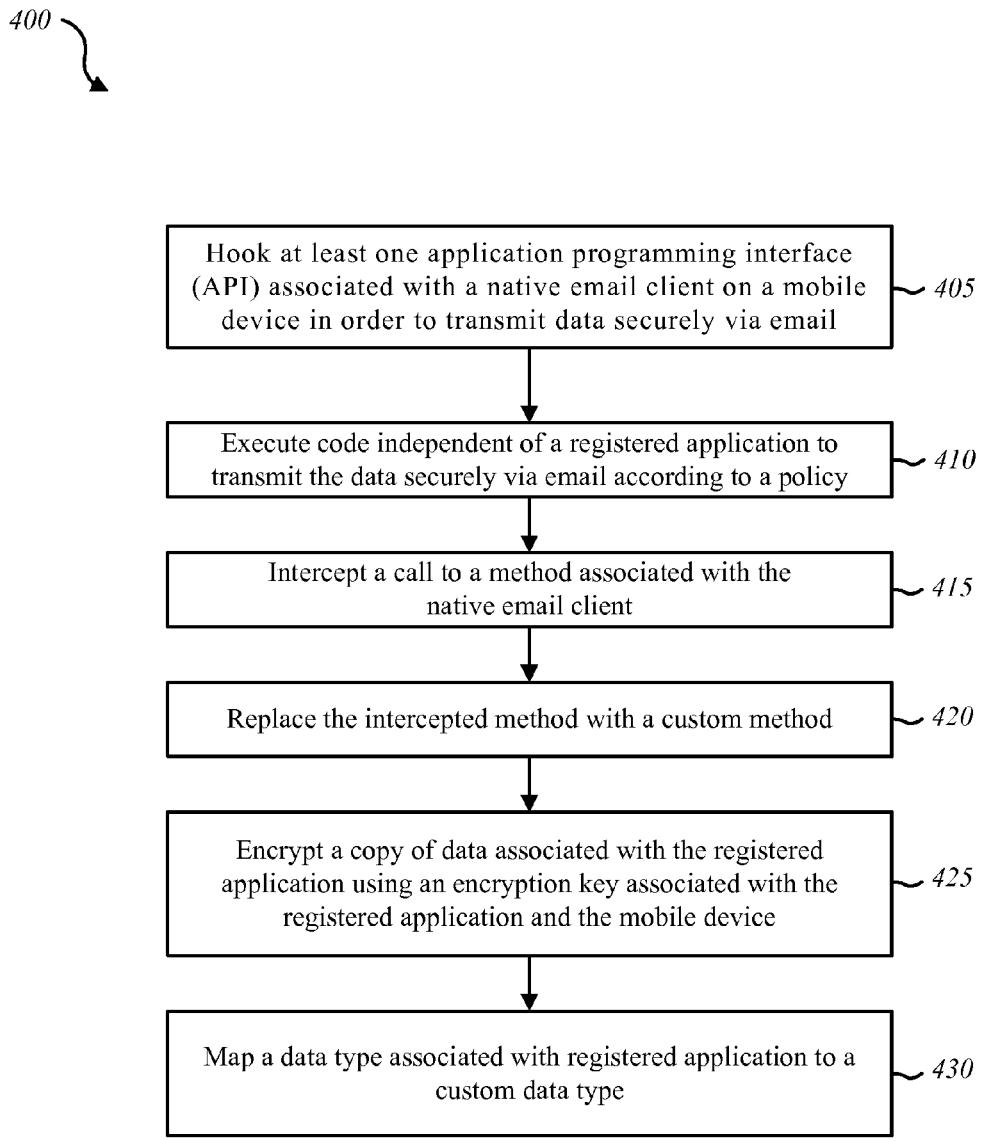
FIG. 4 is a flow diagram illustrating one embodiment of a method to secure mobile email communications independently from an originating application.

FIG. 4 is a flow diagram illustrating one embodiment of a method 400 to secure mobile email communications independently from an originating application. In some configurations, the method 400 may be implemented by the secure email module 130 depicted in FIGS. 1 and/or 2.

At block 405, at least one application programming interface (API) associated with a native email client of an operating system on a mobile device may be hooked in order to securely transmit data to and from the mobile device via email. At block 410, code independent of the registered application (e.g., an executable separate from an executable of the registered application) may be executed to transmit the data securely via email in accordance with a policy configured to protect data of registered applications. At block 415, a call to a method associated with the native email client may be intercepted by the independent code. At block 420, the intercepted method may be replaced with a custom method. At block 425, a copy of the data associated with the registered application that is being emailed may be encrypted using an encryption key that is linked solely to the registered application and the mobile device. At block 430, a data type that is typically associated with the mobile application registered in the registry (i.e., the registered application) may be mapped to a custom data type.

Figure 5:
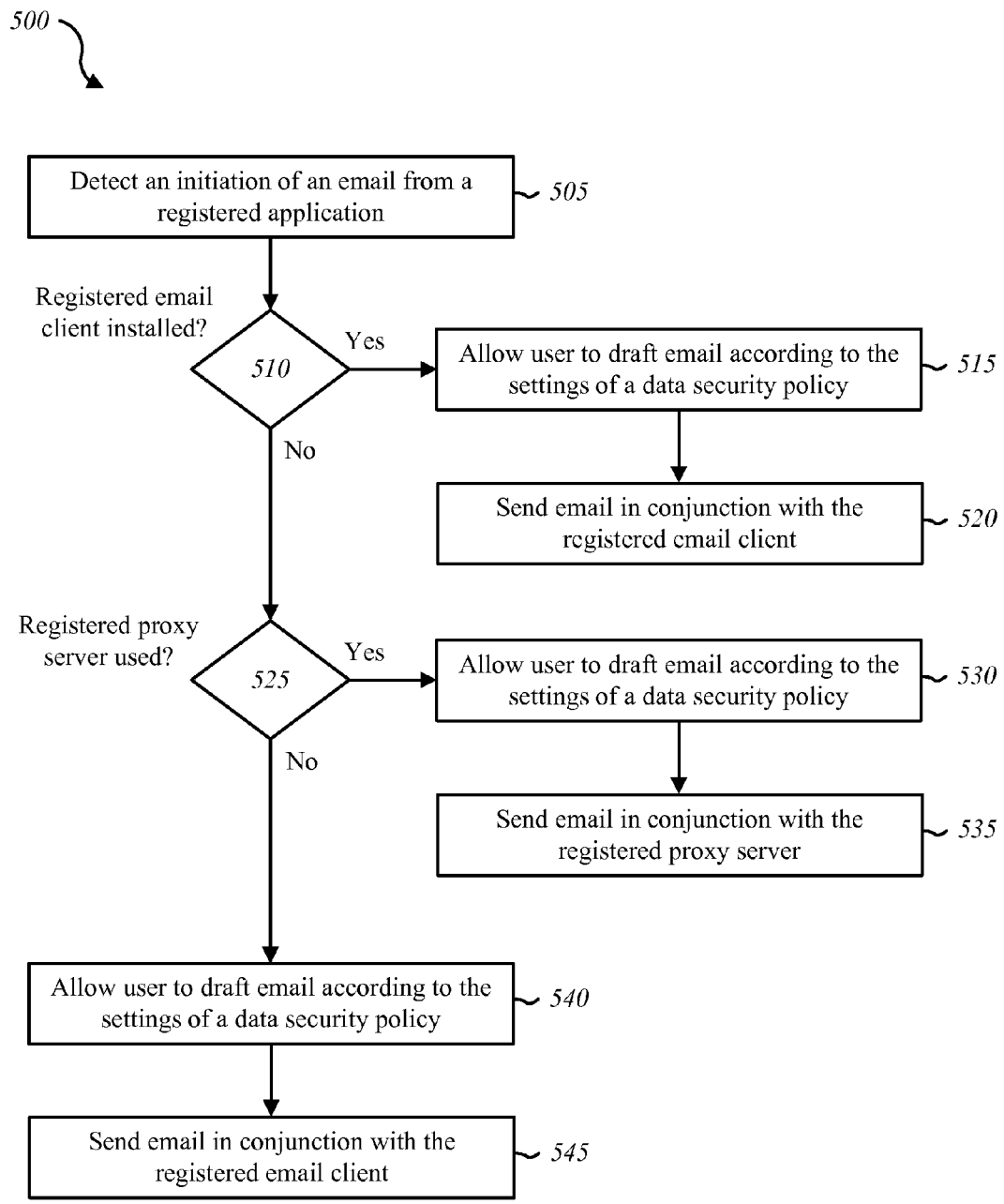
FIG. 5 is a flow diagram illustrating one embodiment of a method to send email securely.

FIG. 5 is a flow diagram illustrating one embodiment of a method 500 to send email securely. In some configurations, the method 500 may be implemented by the secure email module 130 depicted in FIGS. 1 and/or 2.

At block 505, an initiation of an email (e.g., a method call, initialization of an email class reference, initiation of an email interface, a call to an API associated with an email client, etc.) may be detected on a mobile device. The initiation of the email may originate from a registered application in relation to data associated with the registered application. At block 510, it may be determined whether a registered email client is installed on the mobile device. At block 515, upon determining a registered email is installed on the mobile device, a user may be allowed to draft an email according to the settings of a data security policy. At block 520, the email may be sent in conjunction with the registered email client.

Upon determining a registered email is not installed on the mobile device, at block 525, it may be determined whether a registered proxy server is associated with a native email client on a mobile device. At block 530, upon determining a registered proxy server is associated with a native email client on the mobile device, a user may be allowed to draft an email according to the settings of a data security policy. At block 535, the email may be sent in conjunction with the registered proxy server.

Upon determining a registered email is not installed on the mobile device and that a registered proxy server is not associated with a native email client on a mobile device, at block 540, a user may be allowed to draft an email according to the settings of a data security policy. At block 545, the email may be sent in conjunction with the native email client.

Figure 6:
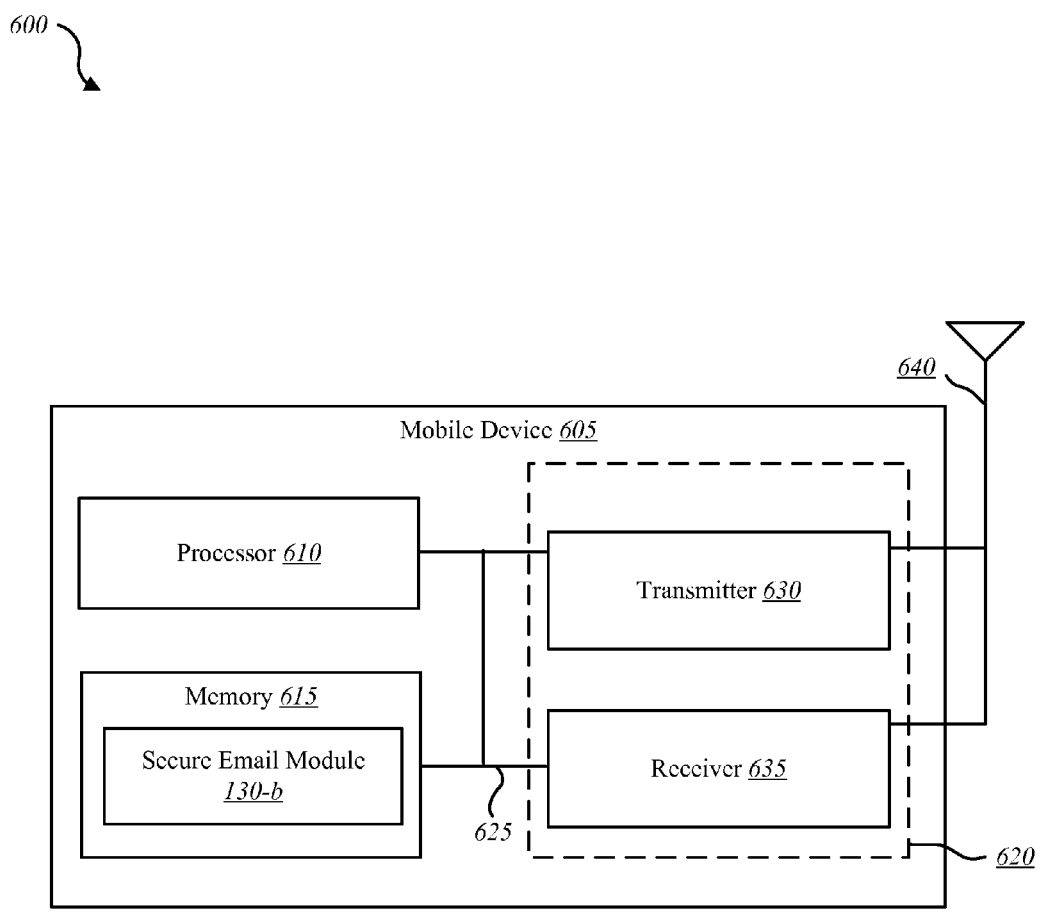
FIG. 6 depicts a block diagram of a computer system suitable for implementing the present systems and methods.

FIG. 6 depicts a block diagram of a computer system 600 suitable for implementing the present systems and methods. In one embodiment, the computer system 600 may include a mobile device 605. The mobile device 605 may be an example of mobile device 105 depicted in FIG. 1. As depicted, the mobile device 605 includes a bus 625 which interconnects major subsystems of mobile device 605, such as a central processor 610, a system memory 615 (typically RAM, but which may also include ROM, flash RAM, or the like), and a transceiver 620 that includes a transmitter 630, a receiver 635, and an antenna 640.

Bus 625 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure email module 130-b to implement the present systems and methods may be stored within the system memory 615. The secure email module 130-b may be one example of the secure email module 130 depicted in FIGS. 1 and/or 2. Applications resident with mobile device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 7:
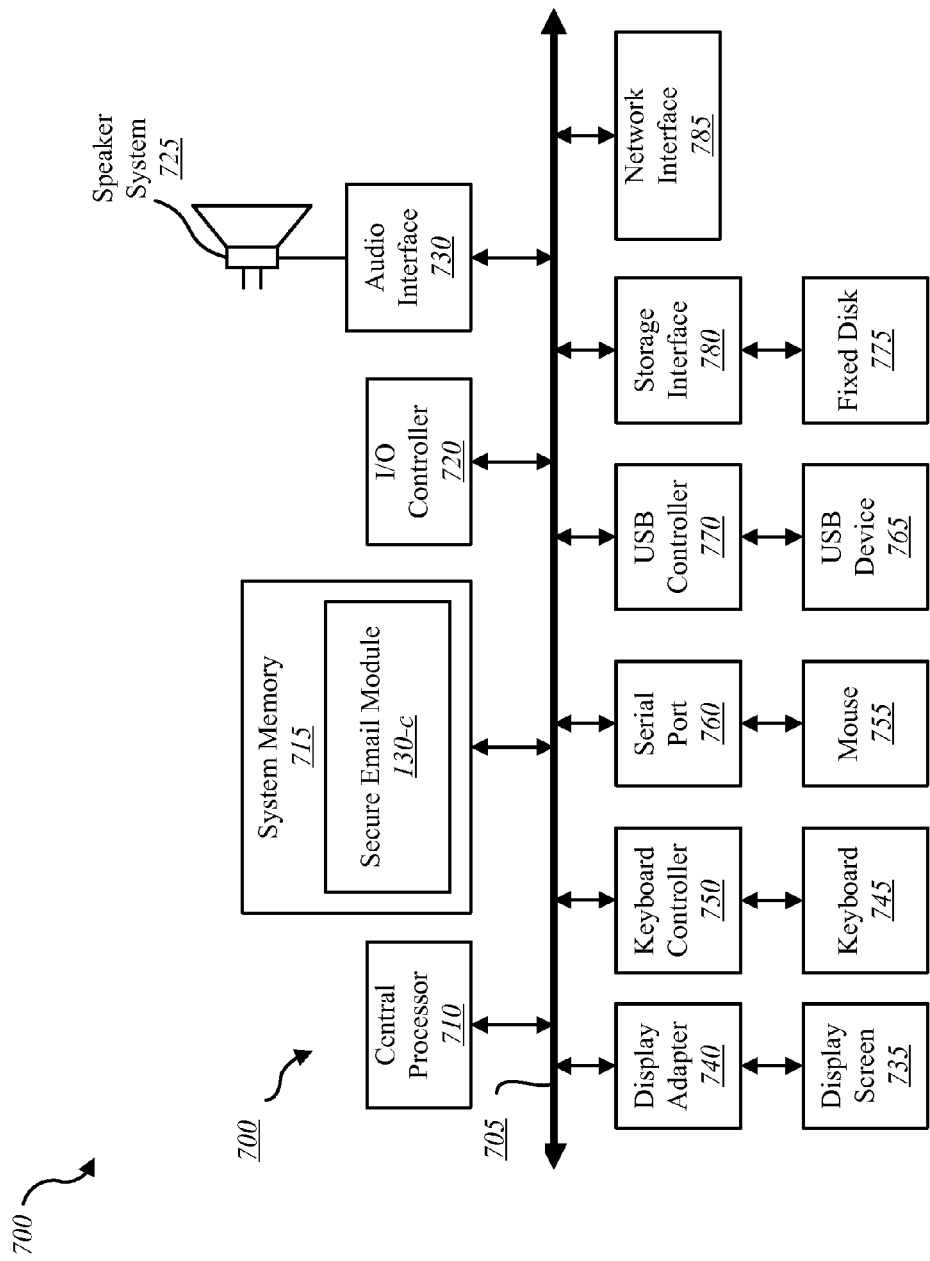
FIG. 7 depicts a block diagram of a computer system suitable for implementing the present systems and methods.

FIG. 7 depicts a block diagram of a computer system 700 suitable for implementing the present systems and methods. Computer system 700 may be one example of server 115, registered proxy server 120, or device 125 depicted in FIG. 1. Additionally, or alternatively, computer system 700 may be one example of mobile device 105 depicted in FIG. 1 or 6. Computer system 700 includes a bus 705 which interconnects major subsystems of computer system 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, a keyboard 745 (interfaced with a keyboard controller 750) (or other input device), multiple USB devices 765 (interfaced with a USB controller 770), and a storage interface 780. Also included are a mouse 755 (or other point-and-click device) connected to bus 705 through serial port 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure email module 130-c to implement the present systems and methods may be stored within the system memory 715. Applications resident with computer system 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of computer system 700, can connect to a standard computer readable medium for storage and/or retrieval of information, such as a fixed disk drive 775. Fixed disk drive 775 may be a part of computer system 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 715 or fixed disk 775. The operating system provided on computer system 700 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing secure mobile email communications, the method comprising:
    hooking at least one application programming interface (API) associated with a native email client in order to transmit data securely via email, the native email client being native to an operating system of a mobile device;
    detecting, via the hooked API, an email originating from a registered application, the email comprising the data to transmit securely, the registered application being registered in a registry according to a mobile application authentication procedure, the registry comprising a plurality of registered applications authenticated according to the mobile application authentication procedure;
    determining whether a registered email client different than the native email client is located on the mobile device, the registered email client being registered in the registry according to the mobile application authentication procedure; and
    upon detecting, via the hooked API, a call to the native email client from the registered application, emailing the data via the registered email client based on the determining.

2. The method of claim 1, further comprising:
    executing independent code in order to transmit the data securely via email, an executable of the independent code being separate from an executable of the registered application.

3. The method of claim 2, further comprising:
    upon detecting, via the hooked API, a call to the native email client from the registered application, emailing the data via the native email client based on the determining.

4. The method of claim 3, wherein emailing the data via the native email client comprises:
    intercepting a call to a method associated with the native email client; and
    replacing the intercepted method of the native email client with a custom method from the independent code.

5. The method of claim 3, wherein emailing the data via the native email client comprises:
    allowing the user, according to a policy configured to protect the data associated with the registered application, to draft the email with an encrypted copy of the data associated with the registered application.

6. The method of claim 1, wherein emailing the data via the registered email client comprises:
    intercepting a call to an interface associated with the native email client; and
    replacing the intercepted interface of the native email client with a custom interface associated with the registered email client.

7. The method of claim 1, wherein emailing the data via the registered email client comprises:
    encrypting a copy of the data associated with the registered application using an encryption key associated with the registered email client and the mobile device; and
    allowing the email to be sent via the registered email client according to a policy associated with the registered application.

8. The method of claim 1, further comprising:
    intercepting a call to an interface of a display API;
    replacing the intercepted interface with a custom interface from the independent code;
    allowing the user to draft the email via the custom interface and according to a policy;
    detecting the user pressing a send button associated with the custom interface; and
    emailing the data via the registered email client.

9. The method of claim 2, further comprising:
    determining, via the independent code, whether a registered encryption gateway is associated with the native email client, the registered encryption gateway being registered in the registry according to a gateway authentication procedure.

10. The method of claim 9, further comprising:
    upon detecting, via the hooked API, a call to the native email client from the registered application and determining that the registered encryption gateway is associated with the native email client, emailing the data via the registered encryption gateway based on the determining.

11. The method of claim 10, wherein emailing the data via the registered encryption gateway comprises:
    intercepting a call to a method associated with the native email client;
    determining whether a policy associated with the registered application allows the user to draft the email; and
    upon determining the policy associated with the registered application allows the user to draft the email, replacing the intercepted method of the native email client with a custom method associated with the registered encryption gateway.

12. The method of claim 10, wherein emailing the data via the registered encryption gateway comprises:
    mapping a multipurpose internet mail extensions (MIME) type of the data associated with the registered application to a custom MIME type to indicate the registered application is enabled to handle the custom MIME type; and
    encrypting a copy of the data associated with the registered application using an encryption key associated with the registered encrypted gateway.

13. The method of claim 1, further comprising:
    generating, as part of the mobile application authentication procedure, an encryption key pair that is unique to the registered application and the mobile device, the encryption key pair comprising a public encryption key and a private encryption key, wherein data associated with the registered application is encrypted based on the encryption key pair.

14. A mobile device configured to provide secure mobile email communications, comprising:

a processor;

memory in electronic communication with the processor;

instructions stored in the memory, the instructions being executable by the processor to:

hook at least one application programming interface (API) associated with a native email client in order to transmit data securely via email, the native email client being native to an operating system of the mobile device;

detect, via the hooked API, an email originating from a registered application, the email comprising the data to transmit securely, the registered application being registered in a registry according to a mobile application authentication procedure, the registry comprising a plurality of registered applications authenticated according to the mobile application authentication procedure;

determine whether a registered email client different than the native email client is located on the mobile device, the registered email client being registered in the registry according to the mobile application authentication procedure; and upon detecting, via the hooked API, a call to the native email client from the registered application, email the data via the registered email client based on the determining.

15. The computing device of claim 14, wherein the instructions are executable by the processor to:

execute independent code in order to securely transmit the data via email, an executable of the independent code being separate from an executable of the registered application.

16. The computing device of claim 15, wherein the instructions are executable by the processor to:

intercept a call to a method associated with the native email client;

replace the intercepted method of the native email client with a custom method from the independent code;

map a multipurpose internet mail extensions (MIME) type of the data associated with the registered application to a custom MIME type; and upon determining a policy associated with the registered application allows the user to draft the email, replace an intercepted interface of the native email client with a custom interface from the independent code.

17. A computer-program product for providing secure mobile email communications, the computer-program product comprising a non-transitory computer-readable medium storing instructions thereon, the instructions being executable by a processor to:

hook at least one application programming interface (API) associated with a native email client in order to transmit data securely via email, the native email client being native to an operating system of a mobile device;

detect, via the hooked API, an email originating from a registered application, the email comprising the data to transmit securely, the registered application being registered in a registry according to a mobile application authentication procedure, the registry comprising a plurality of registered applications authenticated according to the mobile application authentication procedure determine whether a registered email client different than the native email client is located on the mobile device, the registered email client being registered in the registry according to the mobile application authentication procedure; and upon detecting, via the hooked API, a call to the native email client from the registered application, email the data via the registered email client based on the determining.

18. The computer-program product of claim 17, wherein the instructions are executable by the processor to:

execute independent code in order to securely transmit the data via email, an executable of the independent code being separate from an executable of the registered application.

* * * * *